Jan. 14, 1964 L. M. ZOSS ETAL 3,118,108
MOTION OPERATED TRANSDUCER
Filed Nov. 9, 1960

INVENTORS
LESLIE M. ZOSS
ROBERT R. PIEPHO
BY
ATTORNEYS

# United States Patent Office 3,118,108
Patented Jan. 14, 1964

3,118,108
MOTION OPERATED TRANSDUCER
Leslie M. Zoss, Valparaiso, Ind., and Robert R. Piepho, Akron, Ohio, assignors to Valparaiso University Association, Inc., Valparaiso, Ind.
Filed Nov. 9, 1960, Ser. No. 68,195
6 Claims. (Cl. 324—45)

This invention relates to pressure measuring devices and, more particularly, to a device for measuring pressures utilizing the principles of the Hall effect.

Conventional pressure gauges that will produce accurate and consistent measurements have been deficient in that they are either too complex and delicate or they produce an output signal that is difficult to utilize. For example, the strain gauge type of pressure gauge has the disadvantage that it will completely fail if a pressure is applied that is beyond its range. The differential transformer type of pressure gauge has the advantage of ruggedness but it produces an alternating current signal output. This is disadvantageous because it requires additional pieces of equipment which serve only to rectify the alternating current signals or to convert direct current into alternating current which may be used with the differential transformer.

Accordingly, it is a primary purpose of this invention to provide a pressure measuring device which is simple and rugged and which produces a direct current signal output, thereby obviating the above described disadvantages.

It is another primary object of this invention to provide a pressure measuring device which utilizes the principles of the Hall effect.

Figure 1:
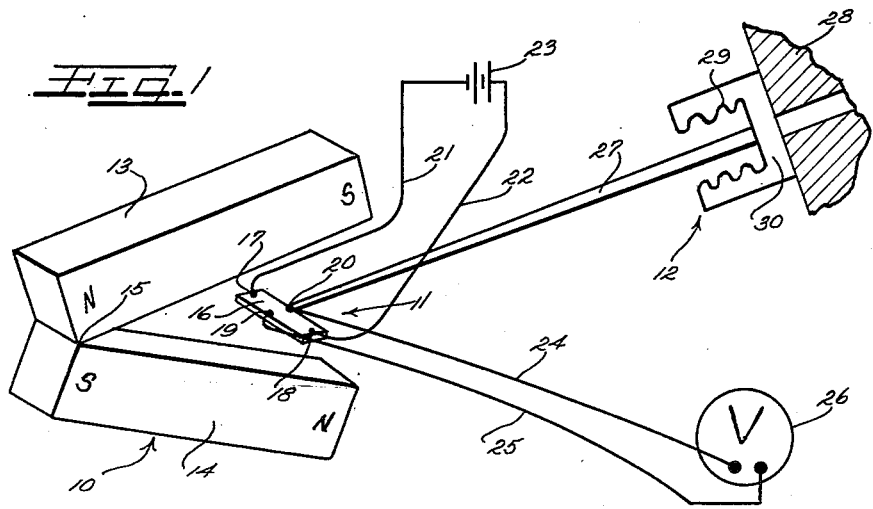
Figure 2:
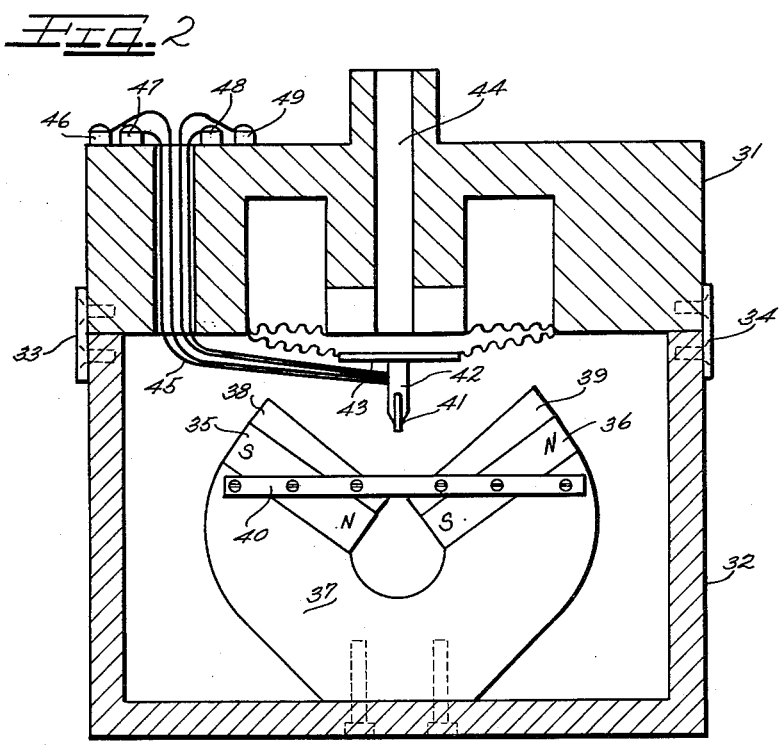

Other objects, features and advantages of the present invention will be apparent from the following detailed decription taken in conjunction with the accompanying figures of the drawings, in which:

FIGURE 1 is a schematic illustration of a pressure measuring device constructed in accordance with the invention; and FIGURE 2 is an illustration of a pressure measuring device constructed in accordance with another embodiment of the invention.

The Hall effect is a well-known phenomenon and may be described briefly as follows:

If an electric current flows through a conductor or a semiconductor which is disposed in a strong transverse magnetic field, a potential difference is developed across the conductor or semiconductor which is at right angles to both the magnetic field and the conductor or semiconductor. This potential difference can be computed from the equation:

$$E = \frac{KBi}{d}$$

where

E is the potential difference or Hall voltage,
$i$ is the control current flowing through the conductor or semiconductor,
B is the flux density,
$d$ is the thickness of the conductor or semiconductor, and
K is the Hall constant of the material being used.

It is apparent from this equation that the magnitude of the Hall voltage E is directly proportional to the flux density of the magnetic field. Therefore, if an element is disposed in a magnetic field that varies in a known manner, the position of the element can be accurately determined by measuring the magnitude of the voltage E developed across the element, if the current flowing through the element is held constant.

A pressure measuring device designed in accordance with these principles is illustrated schematically in FIGURE 1 and includes magnetic means 10 for setting up a magnetic field that varies in a known manner, a Hall probe 11, and a pressure-to-motion transducer 12 that is coupled to the probe 11. Since it is preferable that the control magnetic field vary linearly with distance, the particular arrangement illustrated in FIGURE 1 is employed whereby two magnets 13 and 14 are mounted in a V-shaped configuration with an angle of approximately 55° between them. The polarities of the two magnets 13 and 14 are such that the south magnetic pole of the magnet 13 is adjacent the north magnetic pole of the magnet 14 and the south magnetic pole of the magnet 14 is adjacent the north magnetic pole of the magnet 13. With this arrangement, the magnetic flux density along a line that bisects the 55° angle and passes through the apex 15 varies substantially linearly with distance from the apex 15.

The Hall probe 11 may be any commercial type and includes an element 16 that has two current electrodes 17 and 18 electrically connected to two opposing sides and two voltage electrodes 19 and 20 connected to the remaining two opposing sides. The current electrodes 17 and 18 are connected by two conductors 21 and 22 to an electric potential source 23 such as a battery, and the voltage electrodes 19 and 20 are connected by two conductors 24 and 25 to a direct current voltmeter 26.

The element 16 is mechanically coupled to the transducer 12 by a shaft 27 which is preferably made of a non-magnetic material. The transducer 12 is a conventional type that includes a stationary base 28 and a face 29 that is attached to the shaft 27. The bellows is constructed in a conventional maner so that the movement of the face 29 along the axis of the shaft 27 is substantially directly proportional to the pressure within the cavity 30 in the bellows.

In operation, the position of the probe 16 in the magnetic field set up by the two magnets 13 and 14 will depend upon the magnitude of the pressure in the cavity 30. As the pressure in this cavity 30 increases, the probe 16 is forced in the direction of the apex 15 which is in the direction of increasing magnetic flux density. If the current flowing through the element 16 due to the battery 23 is maintained constant, the voltage at the electrodes or terminals 19 and 20 will depend upon the magnitude of this magnetic flux density. Therefore, the reading on the voltmeter 26 will be indicative of the magnetic flux density at the element 16 which in turn is indicative of the position of the element 16 and the pressure in the cavity 30. It is apparent that the scale on the voltmeter 26 can be calibrated directly in pressure units.

While the device has been described as employing means for setting up a substantially linear magnetic field, it is apparent that any device which sets up a magnetic field that varies with distance will be suitable. For example, if the magnetic field in the air gap between the two magnets 13 and 14 varies exponentially with distance from the apex 15, accurate measurements can be obtained if the scale on the meter 26 also varies exponentially or if the movement of the bellows is also designed to vary exponentially.

The apparatus illustrated in FIGURE 2 is a commercial embodiment of the invention and includes means for increasing the strength of the magnetic field. This apparatus includes a non-magnetic housing that includes an upper portion 31 and a lower portion 32 that are fastened together by two non-magnetic strips 33 and 34. The means for setting up a magnetic field includes two permanent magnets 35 and 36, a yoke 37 that is made of a magnetic material, and two pole pieces 38 and 39 which are also made of a magnetic material. The yoke 37 is fastened to the lower portion 32 of the housing, and the pole pieces 38 and 39, the magnets 35 and 36 and the yoke 37 are fastened together by at least one non-magnetic strip 40.

A Hall probe 41 is mounted on a non-magnetic shaft 42 which is fastened to a bellows 43. It is preferable that the bellows 43 be a small volume type so that it will have as little time lag as possible. An inlet opening 44 formed in the upper portion 31 of the housing provides access to the bellows cavity. A cable 45 containing four conductors connects the electrodes on the Hall probe 41 to four terminals 46, 47, 48 and 49 mounted on the housing. Conventional means are provided, of course, to electrically insulate the four terminals 46, 47, 48, 49 from each other.

The yoke 37 is desirable since it provides a return path for the magnetic field set up by the magnets 35 and 36, thereby increasing the strength of this field between the pole pieces 38 and 39. A series of these pole pieces may be provided which have different faces and which make different angles relative to each other. It should be understood that various other designs of the yoke, the magnets and the pole pieces are possible, a proper choice being dependent upon the magnetic field desired in the air gap between the pole pieces. Furthermore, it is not necessary that two magnets be used since an arrangement of a single U-shaped magnet and two pole pieces will also set up a suitable magnetic field. Also, the invention does not reside in the design of the housing or the manner in which the various elements are mounted in the housing.

It will be apparent that modifications and variations may be effected without departing from the scope of the novel concepts of the present invention.

We claim as our invention:

1. A movement translating device comprising in combination: magnetic means for setting up a magnetic field that varies with distance, said magnetic means including angularly divergent poles defining a wedge-shaped air gap, said poles respectively having confronting unlike magnetic polarities, a movable element, a probe coupled to said movable element and positioned in said air gap, a Hall element mounted on said probe and movable equidistantly between said poles toward and away from the ends thereof in response to movement of said movable element, means for passing current through said element in a direction that is substantially transverse to the direction of said magnetic field, and means for measuring the Hall voltage developed across said element.

2. A movement translating device comprising in combination: magnetic means for setting up a magnetic field that varies with distance, said magnetic means including angularly divergent poles defining a wedge-shaped air gap, said poles respectively having confronting unlike magnetic polarities at their divergent ends and adjacent unlike magnetic polarities of opposite sign at their convergent ends, a movable element, a probe coupled to said movable element and positioned in said air gap, a Hall element mounted on said probe and movable equidistantly between said poles toward and away from the convergent ends thereof in response to movement of said movable element, means for passing current through said element in a direction that is substantially transverse to the direction of said magnetic field, and means for measuring the Hall voltage developed across said element.

3. A movement translating device comprising in combination: magnetic means for setting up a magnetic field that varies with distance, said magnetic means including angularly divergent poles that are positioned at an angle generally in the range of 55° to 100° relative to each other and defining a wedge-shaped air gap, said poles respectively having confronting unlike magnetic polarities, a movable element, a probe coupled to said movable element and positioned in said air gap, a Hall element mounted on said probe and movable equidistantly between said poles toward and away from the ends thereof in response to movement of said movable element, means for passing current through said element in a direction that is substantially transverse to the direction of said magnetic field, and means for measuring the Hall voltage developed across said element.

4. A movement translating device comprising combination: magnetic means for setting up a magnetic field that varies with distance, said magnetic means including angularly divergent poles defining a wedge-shaped air gap, said poles respectively having confronting unlike magnetic polarities, a separate generally U-shaped magnetic yoke having ends in magnetic circuit with said poles and extending away from said air gap about the narrower end thereof, a movable element, a probe coupled to said movable element and positioned in said air gap, a Hall element mounted on said probe and movable equidistantly between said poles toward and away from the ends thereof in response to movement of said movable element, means for passing current through said element in a direction that is substantially transverse to the direction of said magnetic field, and means for measuring the Hall voltage developed across said element.

5. A movement translating device comprising in combination: magnetic means for setting up a magnetic field that varies with distance, said magnetic means including angularly divergent poles defining a wedge-shaped air gap, said poles respectively having confronting unlike magnetic polarities, separate wedge-shaped pole piece means comprising magnetic material removably provided on at least one of said poles for selectably altering the magnitude of said wedge-shaped air gap, a movable element, a probe coupled to said movable element and positioned in said air gap, a Hall element mounted on said probe and movable equidistantly between said poles toward and away from the ends thereof in response to movement of said movable element, means for passing current through said element in a direction that is substantially transverse to the direction of said magnetic field, and means for measuring the Hall voltage developed across said element.

6. A movement translating device comprising in combination: magnetic means for setting up a magnetic field that varies with distance, said magnetic means including angularly divergent poles that are positioned at an angle generally in the range of 55° to 100° relative to each other and defining a wedge-shaped air gap, said poles respectively having confronting unlike magnetic polarities at their divergent ends and adjacent unlike magnetic polarities of opposite sign at their convergent ends, a separate generally U-shaped magnetic yoke having ends in magnetic circuit with said poles and extending away from said air gap about the narrower end thereof, separate wedge-shaped pole piece means comprising magnetic material removably provided on at least one of said poles for selectably altering the magnitude of said wedge-shaped air gap, a movable element, a probe coupled to said movable element and positioned in said air gap, a Hall element mounted on said probe and movable equidistantly between said poles toward and away from the convergent ends thereof in response to movement of said movable element, means for passing current through said element in a direction that is substantially transverse to the direction of said magnetic field, and means for measuring the Hall voltage developed across said element.

References Cited in the file of this patent

UNITED STATES PATENTS

| | | |
|---|---|---|
| 2,331,128 | MacNeil | Oct. 5, 1943 |
| 2,907,897 | Sander | Oct. 6, 1959 |
| 2,987,669 | Kallmann | June 6, 1961 |